United States Patent Office 2,829,006
Patented Apr. 1, 1958

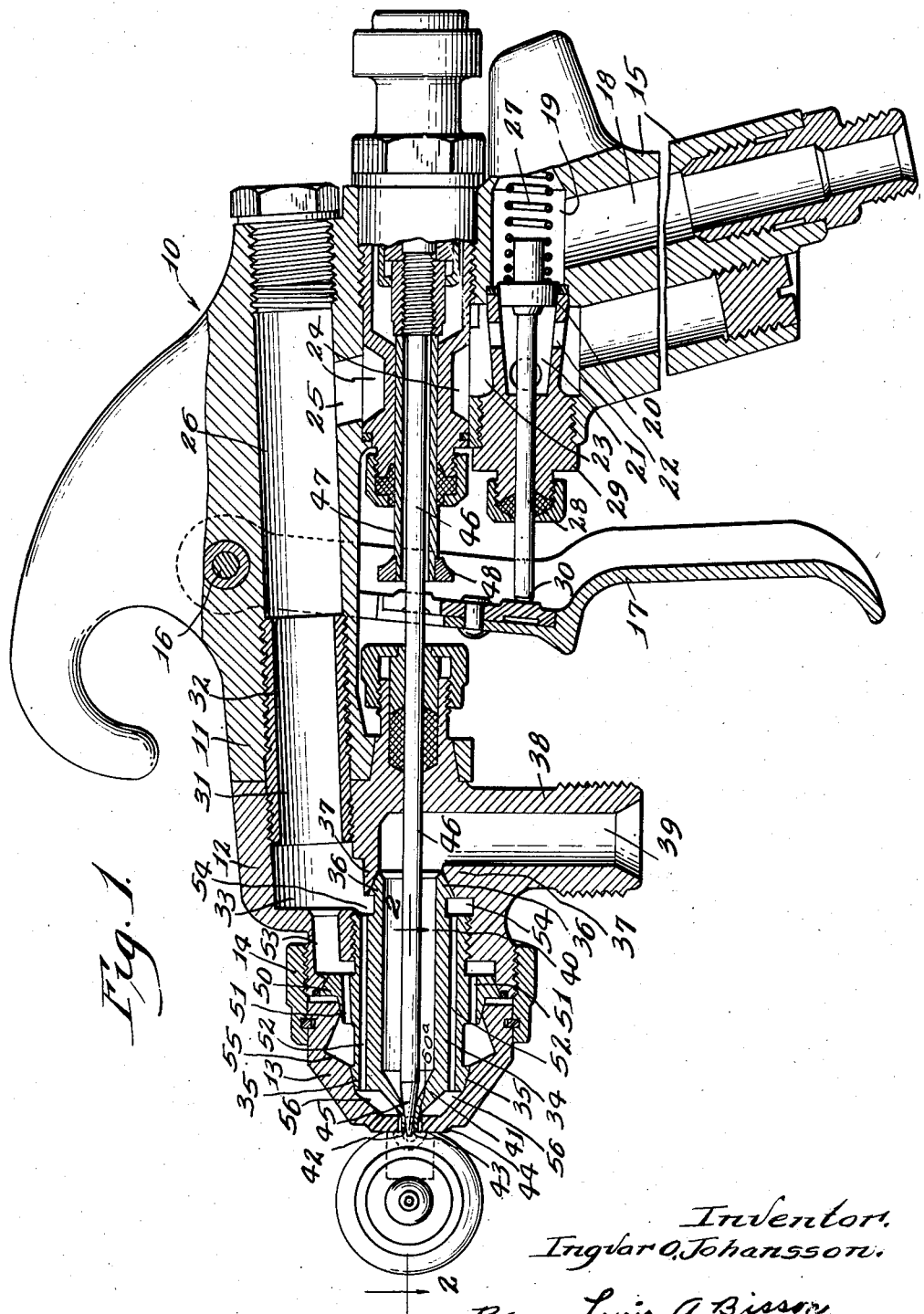

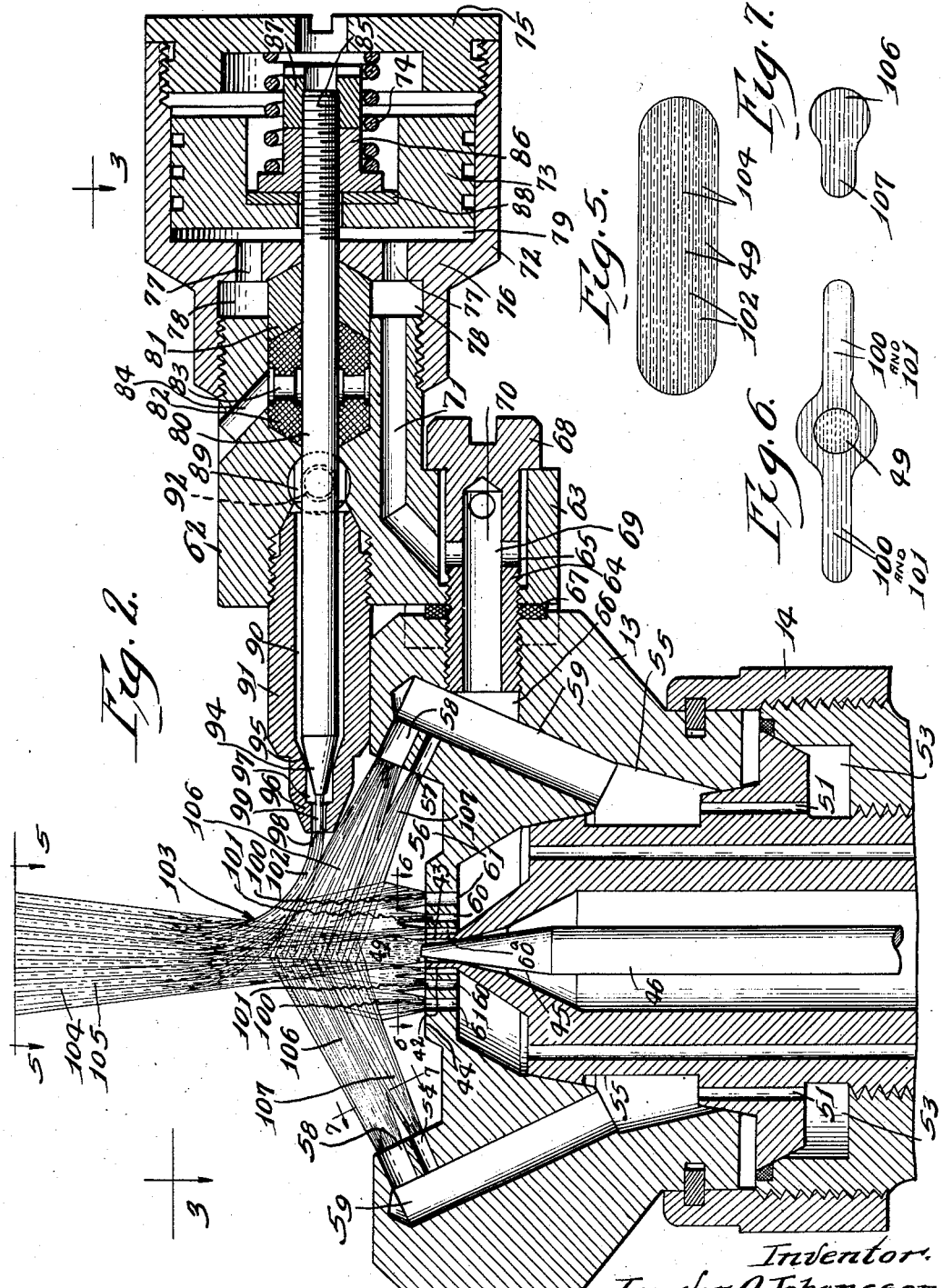

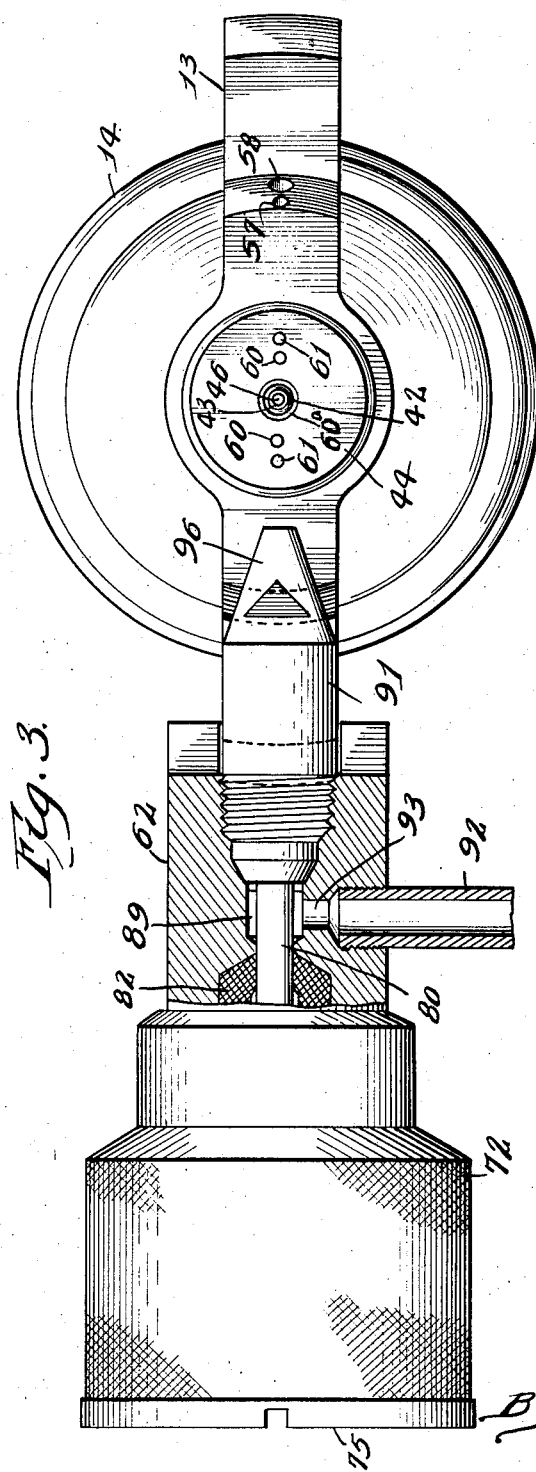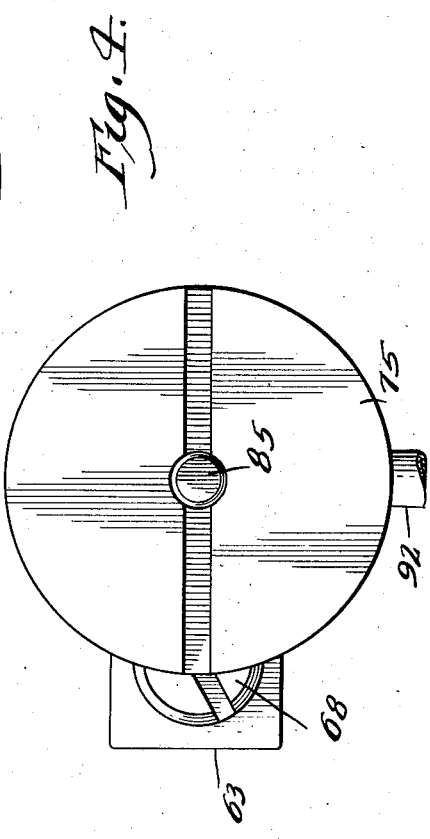

2,829,006

SPRAY COATING MEANS

Ingvar O. Johansson, Chicago, Ill., assignor to Binks Manufacturing Company, Chicago, Ill., a corporation of Delaware Continuation of application Serial No. 226,257, May 14, 1951. This application June 10, 1954, Serial No. 435,901

4 Claims. (Cl. 299—140.1)

The present invention relates to the spraying of non-premixable materials for coating, and is a continuation of my copending application for patent Serial No. 226,257, filed May 14, 1951, and now abandoned.

There are some substances, such as an enamel type of coating material, which when applied has or needs a rapid curing, and it has been found, that may be effected, as by way of example, by a substance generally known as a catalyst, which acts rapidly.

The invention comprehends the spraying of a coating material, such as an enamel type of coating material as referred to above, and the projecting, in such spray, the curing material, such as a catalyst as mentioned above, whereby the two mix or unite and react together during the spraying action to be in proper condition for coating the surface being coated.

Other objects, advantages, capabilities, features, and the like are comprehended by the invention as will later appear, or as are inherently possessed by the invention.

Referring briefly to the drawings:

Fig. 1 is part sectional and part elevational view of the invention;

Fig. 2 is a sectional view of parts on an enlarged scale and as taken in a plane represented as line 2—2 of Fig. 1 of the drawings;

Fig. 3 is a view in elevation of the means shown in Fig. 2 and as in a plane represented by line 3—3 in Fig. 2 and showing a part in section;

Fig. 4 is a view in elevation of a part shown in Fig. 3;

Fig. 5 is a sectional view as taken in a plane represented by line 5—5 in Fig. 2 of the drawings and looking in the direction of the arrows;

Fig. 6 is a sectional view as taken in a plane represented by line 6—6 in Fig. 2 of the drawings and looking in the direction of the arrows; and Fig. 7 is a sectional view as taken in a plane represented by the line 7—7 in Fig. 2 of the drawings and looking in the directions of the arrows.

Referring now more in detail to the drawings, the embodiment selected to illustrate the invention is shown as comprising a spray gun 10 having a body portion 11, a head portion 12, a nozzle portion 13 connected to the head portion 12 by a suitable coupling means or the like 14, and a handle portion 15.

On the body portion 11 is pivotally mounted by way of pivots means 16 a hand operated control means or trigger 17. The handle 15 has an air entry passage 18 leading to a valve chamber 19 having a valve 20 controlling passage of air under pressure to the forward chamber portion 21 having a passage portion 22, 23, leading to an air passage 24 leading to an air passage 25 which in turn leads to the air chamber or passage 26 provided in the upper part of the body 11, as shown in Fig. 1.

The valve 20 is normally held closed by a spring 27 and this valve 20 has a valve stem 28 slidable in part 29 of the body 11 and having its outer end portion 30 in operative engagement with the hand operated trigger 17, which when pulled back by the hand of the operator moves the rod 28 and opens the valve 20 and lets air under pressure to pass by way of passages 21, 22, 23, 24, 25 to the passage 26.

The air then passes from the air passage or chamber 26 to passage or chamber 31 provided in a connecting piece or coupling member 32 between the body portion 11 and the head portion 12. This passage 31 leads to a chamber 33 provided in the head portion 12.

Within the nozzle portion 13 and in the forward portion of the head portion 12 is located a material and air passage member 34 having a forward contacting portion 35 seated against the nozzle portion 13, and a rearward contacting portion 36 with a portion 37 of the head portion 12. The head portion 12 has a material inlet portion 38 having a material passage 39 leading to a material chamber or passage 40 provided in the member 34 and leading to a tapered portion 41 having a material projecting nozzle 42 extending in a central opening 43 provided in the front 44 of the nozzle part 13, and the projecting of the coating material through said nozzle 42 being controlled by a tapered valve part 45 carried at the forward end portion of a valve stem 46 extending rearwardly in the material chamber 40 and into the gun body portion 11 rearwardly of the hand trigger member 17, and also carrying a sleeve-like member 47 slidable in the gun body 11 as shown in Fig. 1, the sleeve-like member 47 having a head 48 at the rear of the hand trigger 17 to be contacted by and moved rearwardly when the hand trigger member 17 is pulled back by the user or operator's hand so as to likewise move the valve stem 46 rearwardly and hence the valve 45 is opened to cause the material in the chamber 40 to be projected out as a liquid stream 49. See Fig. 2.

The member 34 has an intermediate portion 50 making sealing contact with the nozzle portion 13 and the head portion 12, and has or is provided with air passages 51, 52, leading from air chamber 33 by way of ducts 53, 54, respectively, and air ducts 51 lead to air chamber 55 provided in the nozzle portion 13, and air ducts 52 lead to air chamber 56 in the front portion of the nozzle portion 13. The portion 13 also has air passages 59 leading from the air-chamber 55 to side ports or jet orifices 57, 58, for projecting of air jets or streams 107, 106, for acting on the central stream 49 of material projected from the nozzle 42. Thus, from the chamber 55 lead air passages 59 (see Fig. 2) for supplying the air to the side orifices 57, 58. See Fig. 7. The ducts or air passages 52 lead to the chamber 56 which chamber has air projecting orifices 60, 60, 61, 61, and also an annular opening 60ª, for projecting air around or against the liquid stream projected from the material nozzle 42. See Fig. 6. The air 107, 106 projected from the orifices 57, 58, and all the air projected from the orifices 60, 61, and also the air projected from the annular orifice 60ª will unite as shown in Fig. 6 to enshroud, so to speak, the main liquid stream 49.

The means for projecting the curing the material, such as a catalyst or the like, is shown more particularly in Figs. 2 and 3. It comprises a body portion 62 having a part 63 at a side of the body portion 62 and this part 63 is connected to the nozzle portion 13 by a connecting or coupling member or element 64 which has a passage 65 leading from and in communication by a passage 66 with an air passage 59 provided in the nozzle portion 13. A suitable packing means or buffer 67 is provided between the side part or extension 63 and the nozzle portion 13. The rear portion of the side part 63 has a suitable movable head or plug 68. The side part 63 has a chamber or passage 69 open to and communicating with a passage 70 provided in the connecting portion 64 and also laterally connecting and communicating with a passage 71 provided in the body portion 62.

At the rear of the body portion 62 is suitably connected a piston chamber member 72 in which is contained a movable piston member 73 normally urged forward by a spring or the like 74 reacting against a cap or head 75 suitably connected to the rear end of the chamber 72. The member 72 has a wall 76 provided with openings 77 communicating with a chamber 78 and a piston chamber 79 in the member 72 and forwardly of the piston 73.

Connected to the piston 73 is a valve stem 80 which is slidable in the wall 76 and packing means or the like 81, 82, through which the valve stem 80 is slidable, the packing means 81, 82 being held in place in the rear portion of the body portion 62. The packing member 82 has a suitable relief chamber 83 leading to a relief passage 84 provided in the body portion 62.

The rear end portion 85 of the stem 80 may be suitably engaged, as by threads, to holding members 86, 87, located in the spring 74, the member 86 pressing against a piece 88 in the piston 73 as clearly shown in Fig. 2.

The body portion 62 has a chamber 89 through which extends the valve rod 80, and the chamber 89 at its forward portion communicates with a passage 90 provided in a nozzle member 91 secured at its rear portion to the body portion 62.

At the lower portion of the body portion 62 is connected a duct 92 for conducting the catalyst or the like to the chamber 89 by way of a suitable passage 93 in the body portion 62 and leading to the chamber 89.

The valve stem 80 extends through the chamber 90 of the nozzle member 91 and has at its forward end portion a valve part 94 normally seated on and closing the nozzle seat portion 95 of the nozzle member 91.

The forward portion of the nozzle member 91 has an orifice portion 96 having a chamber 97 and an orifice 98 and the valve part 94 extends in the chamber 97 and has a valve tip 99, this tip normally being of smaller size or diameter than that of the orifice 98.

In operation, when the hand trigger 17 is pulled back it first opens the valve 20 to let the air under pressure to pass along passages 18, 26, 31, 52, to chamber 56 and orifices 60, 61, and also by way of the ducts 53, 51 to chamber 55 and thence to the passages 59, 57, 58 and at the same time air under pressure flows by way of the passage 59 by way of the passages 66, 70, 69, 71, 78, 77 to piston chamber to move the piston 73 and the valve stem 80 and valve 94 for the curing material to pass up by way of the duct 92, chamber 89, passage 90 and nozzle orifice 96, while at the same time the further pull on the hand trigger 17 causes it to contact the head 48 and hence the opening of the valve 45 for the coating material to be sprayed beyond the orifice 43, the air from the air orifices 60, 61 dressing the liquid spray from the orifice 43 and the side nozzles 57, 58 applying further dressing to the spray liquid, and at the time the curing spray from the nozzle 96 will be projected into the material and air being sprayed from the nozzle portion 13, so that the curing spray from the nozzle 96 will be turned and be carried with the spray from the nozzle portion 13 and do its curing effect in the transit of the combining sprays so that the coating material from the nozzle portion 13 will arrive in mixed condition on the surface to be or being coated.

Looking more particularly to Fig. 2, the coating material 49 as it is projected from the opening or central orifice 43 is first in a liquid stream 49, and from the air orifices 60ª, 60, 61, are proojected air streams 60ª, 100, 101, which move along with the liquid stream 49 and mixes with it, and from the orifice 98 is projected a stream of the curing or like material 102 transversely of the stream or streams 49, 60ª, 100, 101, from the nozzle 13, the stream 102 as it enters stream or streams 49, 60ª, 100, 101, turns at the locus 103 to then proceed with the stream or streams 49, 60ª, 100, 101, in a resultant stream 104 and 105, the part 105 indicating in general the turned and the proceeding portion of the stream 102 beyond the turn 103 and blending or mixing and acting on the resultant stream portion 104. Thus, by the time the materials have reached the surface to be coated the curing or like coating portion of the stream 104 shall have so united or combined and acted upon as to effect the coating material as to be coated on the surface (not shown) to be coated with desired coating material. At the same time where it is desired to spread the stream, as in a more or less flattened form, as usual from spray guns generally, then air streams 106, 107, will be projected from the side ports or jet orifices 57, 58, to connect with or impact the stream 49, 100, 101, at or near the locus 103 (see Fig. 2) the air streams 106, 107 on one side, nearest the nozzle 96, engage the stream 102 to bend it as it moves to the surface to be coated and mixes with the stream or streams 49, 100, 101.

Referring now to Figs. 5, 6 and 7, these show in a general way the composition of the resultant streams and are marked to indicate the nature of the composition, as for example the catalyst component is generally shown as dot and dash lines; the air component as full or long lines; and the coating component as dotted lines.

While I have disclosed a form of spray gun with a form of laterally projecting means and a way of causing the streams from both to contact and unite, I do not want to be limited to particular forms shown by way of illustration nor to the particular process or method chosen to illustrate the invention.

Having thus disclosed the invention, I claim as my invention:

1. In a spray device for spraying coating material intimately commingled with a liquid curing agent, the combination with a primary spray gun for dispersing the coating material provided with a longitudinally disposed aperture, and valve stem means for normally closing said aperture, of means associated with said stem for imparting reciprocatory movement of said stem relative to said aperture, said means including means for controlling admission of pressure fluid and coating material to said spray gun, a plurality of orifices disposed in a plane intersecting said aperture with their openings in parallel alignment with the axis of said aperture, and a plurality of jet ports coplanar with said aperture and said orifices, and having their axes arranged to substantially radially converge and intersect a line extending axially of said aperture, and a secondary spray gun associated with said primary spray gun and serving to emit a curing agent into the path of coating material dispersed from said primary spray gun and having the aperture of its nozzle positioned with its axis substantially at right angles to the axis of the aperture of said primary spray gun.

2. In a spray device as claimed in claim 1, wherein said secondary spray gun includes valve rod means and means remote from said nozzle for maintaining said valve rod means normally in closed position, duct means interposed between said nozzle means and said valve closing means, and communicating chambers between said primary and secondary spray guns, whereby upon actuation of said means for imparting reciprocatory movement to said valve stem, pressure fluid may be admitted in succession to the primary spray gun and thence to the secondary spray gun to thereby move said normally closed valve rod means to open position to substantially simultaneously intermingle and disperse the materials from the said primary and secondary spray guns.

3. In a spray device as claimed in claim 2, wherein the means for imparting reciprocatory movement of said valve stem includes means associated therewith for successively actuating means controlling the pressure fluid supply and thence the means for reciprocating said valve stem means relative to said aperture.

4. In a spray device as claimed in claim 2, wherein the means for maintaining said valve rod means normally in a closed position on said secondary spray gun means includes a resilient element interposed between a rigid wall and a piston associated with said valve rod means.

References Cited in the file of this patent

UNITED STATES PATENTS

| | | |
|---|---|---|
| Re. 20,117 | Power | Sept. 22, 1936 |
| 2,068,892 | Schweitzer | Jan. 26, 1937 |
| 2,265,209 | Thompson | Dec. 9, 1941 |
| 2,335,116 | Hansen | Nov. 23, 1943 |
| 2,450,503 | Drummond | Oct. 5, 1948 |
| 2,501,839 | Bodle et al. | Mar. 28, 1950 |
| 2,570,245 | Junge | Oct. 9, 1951 |